United States Patent [19]
Barnett et al.

[11] 3,990,604
[45] Nov. 9, 1976

[54] PLUG OR CLOSURE

[75] Inventors: Barry Roger Michael Barnett, West Drayton; Douglas William Birmingham, Ickenham, both of England

[73] Assignee: TRW Inc., Cleveland, Ohio

[22] Filed: Nov. 11, 1974

[21] Appl. No.: 522,714

[30] Foreign Application Priority Data
Nov. 14, 1973 United Kingdom............... 52797/73

[52] U.S. Cl................................ 220/307; 220/308; 220/320; 220/323; 220/352; 215/294; 215/358

[51] Int. Cl.²......................................... B65D 43/10

[58] Field of Search........... 220/307, 308, 315, 352, 220/323, 324, 233, 234, 326, 319, 320, 358; 215/294, 296, 355, 358; 24/213 CS; 229/5.6

[56] References Cited
UNITED STATES PATENTS

| | | | |
|---|---|---|---|
| 1,595,820 | 8/1926 | Brede................................. | 220/324 |
| 2,252,925 | 8/1941 | Hall..................................... | 24/73 |
| 2,495,247 | 1/1950 | Friedman........................... | 220/358 |
| 2,497,827 | 2/1950 | Trafton............................... | 220/324 |
| 2,637,462 | 5/1953 | Becker............................... | 220/352 |
| 3,023,924 | 3/1962 | Boyer.................................. | 220/324 |
| 3,294,274 | 12/1966 | Spitzberg........................... | 220/358 |
| 3,346,135 | 10/1967 | Haitsch.............................. | 215/296 |
| 3,599,540 | 8/1971 | Koboldt et al...................... | 229/5.6 |

Primary Examiner—William Price
Assistant Examiner—Joseph M. Moy
Attorney, Agent, or Firm—James R. O'Connor

[57] ABSTRACT

A plug for closing an aperture in a panel comprising a metal plate portion and a plurality of metal legs. The plate portion and the legs can be formed from different materials having different characteristics. Each leg comprises an attaching portion which attaches the leg on the plate portion and a mounting portion which depends from the plate portion. The legs are so shaped and positioned that they are co-operatively snap-engagable through the aperture in the panel to mount the plug in the aperture. The legs and the plate portion are manufactured separately and subsequently assembled. A sealing ring having a channel shaped cross-section is optionally attached to the periphery of the plate portion so as to overlie the upper and lower surfaces of the periphery of the plate portion.

4 Claims, 7 Drawing Figures

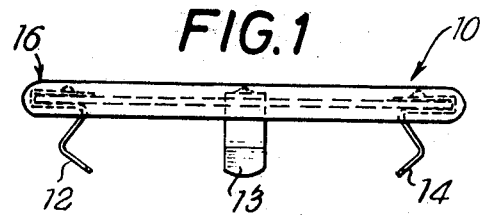
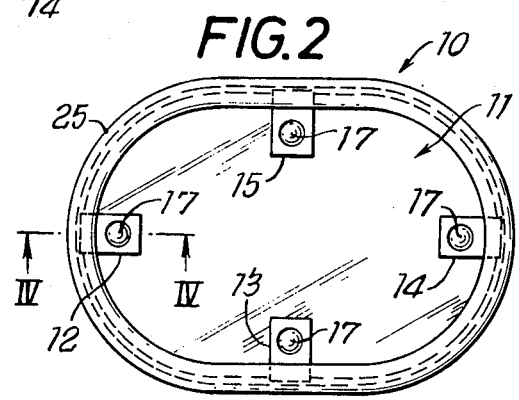
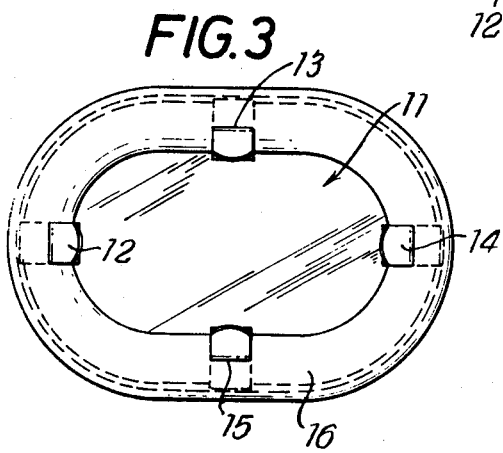
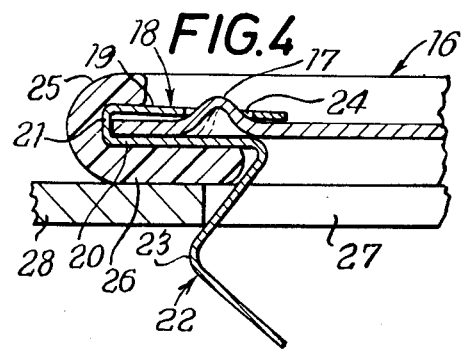
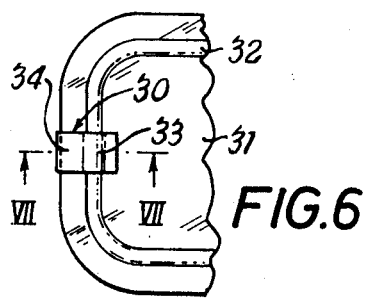
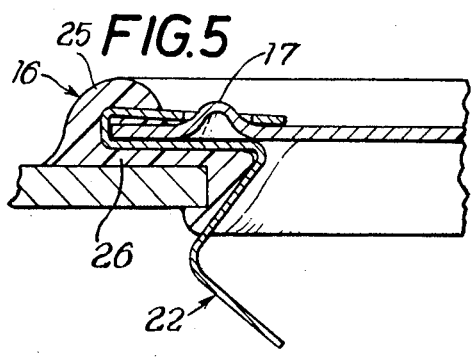
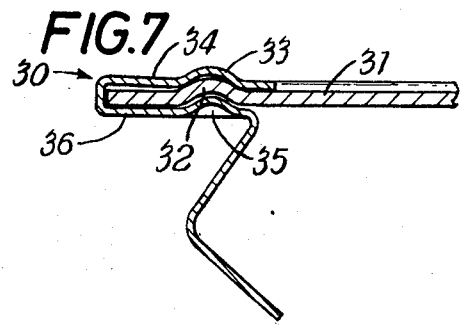

PLUG OR CLOSURE

BACKGROUND OF THE INVENTION

The present invention relates to a plug for closing an aperture in a panel and in particular to a plug for closing and sealing an aperture in a body panel of a vehicle.

It is well known to provide a plug for closing an aperture in a panel comprising a substantially flat plate portion and a plurality of integral legs depending from the plate portion which are adapted to snap-engage into the aperture in the panel to secure and clamp the plate portion against the panel.

Hitherto, plugs of this type have been formed from carbon steel and the legs which snap-engage through the aperture in the panel have been formed integrally with the plate portion. The legs must have a substantial amount of resilience and the plug has been rendered resilient during manufacture.

However, in some applications it is necessary to form the plate portion from a relatively heavy gauge steel in order to achieve sufficient strength, for instance if the plug is of the order of eighty millimeters in diameter, and problems then arise in forming the legs if they are integral with the heavy gauge steel plate portion.

In order to overcome these problems, we now provide a plug comprising a plate portion and a plurality of separate legs which are attached to the plate portion and which are adapted to snap-engage through an aperture in a panel to secure the plate portion to the panel. This enables the plate portion and the legs to be formed from different gauge material, for instance the plate portion can be formed from a relatively heavy gauge mild steel and the legs from a relatively thin carbon steel. The legs can also be rendered resilient before they are attached to the plate portion.

We have also found that the known metal type of plug does not always make an effective seal against the panel in which it is mounted. In order to overcome this problem it is known to coat the undersurface of the periphery of the plate portion of the plug with a sealing material such as a heat softenable plastics material. However, this has a number of manufacturing disadvantages and we have found that this problem can be solved more efficiently by attaching a separate sealing ring on the rim of the plate portion of the plug after the legs have been attached to the plate portion so that in use a part of the sealing ring is trapped between the plate portion and the panel when the plug is mounted in an aperture in the panel.

STATEMENT OF THE INVENTION

A plug for closing an aperture in a panel, the plug comprising a metal plate portion and a plurality of metal legs, each leg comprising an attaching portion and a mounting portion, the attaching portion being attached to the plate portion and the mounting portion depending from the plate portion at a position adjacent the periphery of the plate portion, the legs being so shaped and arranged that they are co-operatively snap-engagable through the said aperture in a panel wherein the legs are manufactured separately from the plate portion and subsequently attached thereto.

In an alternative embodiment the invention comprises a plug for closing an aperture in a panel, the plug comprising a metal plate portion, a plurality of separate metal legs attached to the plate portion and adapted, in use to be snap-engagable through the said aperture to mount the plug therein and a sealing ring mounted on the periphery of the plate portion so as to overlie the upper and lower surfaces of the plate portion in the region of the periphery of the plate portion.

DESCRIPTION OF THE DRAWINGS

FIG. 1 is an elevation of a plug according to the present invention,

FIG. 2 is a plan view of the plug shown in FIG. 1,

FIG. 3 is an underplan of the plug shown in FIG. 1,

FIG. 4 is a sectional view taken on the line IV — IV of FIG. 2,

FIG. 5 is a view similar to FIG. 4 showing the condition of the plug after it has been subjected to a high temperature, FIG. 6 is a plan view of a detail of a plug forming a further embodiment of the invention, and FIG. 7 is a sectional view taken on the line VII — VII of FIG. 6.

DESCRIPTION OF THE PREFERRED EMBODIMENTS

In FIGS. 1 to 5 a plug is indicated generally at 10 which comprises a plate portion 11 formed from mild steel, four legs 12, 13, 14 and 15 and a sealing ring 16.

The mild steel plate portion 11 is substantially flat and oblong in shape and is formed with four raised dimples 17, each being positioned mid-way along one of the four sides of the plate portion and spaced a short distance from the edge.

The four legs 12 to 15 are similar and are formed from a carbon steel which is rendered resilient and preferably rust-proof during manufacture. Each leg 12 to 15 comprises a U-shaped attaching or gripping portion 18 having two arms 19 and 20 which are joined by a web 21 and a snap-engaging limb 22 which is bent intermediate its length so as to form an outwardly directed elbow 23.

The arm 19 of each leg 12 to 15 is formed with a circular aperture 24 and each leg is attached to the plate portion 11 by forcing the U-shaped gripping portion 18 of the leg onto the edge of the plate portion 11 until the aperture 24 in the arm 18 locates over a dimple 17 in the plate portion 11.

When the legs 12 to 15 have been attached to the plate portion 11 in this manner, the sealing ring 16 is stretched and sprung onto the rim of the plate portion 11 so that it overlies and partially covers the legs 12 to 15.

The sealing ring 16 is preferably formed from a synthetic plastics material such as a polythene copolymer and includes upper and lower flanges 25 and 26, the upper flange 25 overlying the arms 18 of the clips 12 to 15 and the lower flange 26 which is substantially wider overlying the arms 20 of the clips 12 to 15 and extending up to the limbs 22 of the four legs.

When the ring 16 has been attached to the plate portion 11 the plug 10 is then used to close an aperture 27 formed in a panel 28 which may by way of example comprise a body panel of a vehicle. The plug 10 is mounted in the aperture 27 by pressing the four legs 12 to 15 downwardly through the aperture 27. As the legs 12 to 15 pass through the aperture 27 the elbows 23 engage the rim of the aperture and the legs are pressed resiliently inwardly and then spring out behind the panel 28 to clamp the lower flange 26 of the sealing ring 16 between the panel and the plate portion 11, thereby making an effective seal around the aperture 27.

When the plug 10 is mounted in the aperture 27 the plate portion 11 closes the aperture 27 and the sealing ring 16 makes an adequate seal around the aperture 27.

If the panel 28 is then subjected to relatively high temperatures, for instance by passing the panel through a paint drying oven, then the polythene co-polymer sealing ring will soften and flow slightly so as to bond the plate portion 11 to the panel 28 as shown in FIG. 5. The sealing ring and the plate portion 11 thereafter make a complete seal around the aperture 27 and the plate portion 11 and panel 28 can be subjected to substantial stress without any risk of the seal being broken.

It will be understood that the legs 12 to 15 can be attached to the plate portion 11 in any convenient manner, for instance each leg can be attached in the manner illustrated in FIGS. 6 and 7 which shows a leg 30 attached to a plate portion 31.

The plate portion 31 is formed with a continuous rib 32 in its upper surface and each leg 30 has a groove 33 formed across its upper arm 34 and a dimple 35 pressed upwardly into its lower arm 36. In order to attach the leg 30 to the plate portion 31, the gripping portion of the leg 30 is forced onto the edge of the plate portion 31 until the rib 32 locates in the groove 33 and the dimple 35 locates in the rib 32. This method of attachment allows the position of the leg 30 on the edge of the plate portion 31 to be adjusted readily while ensuring that the leg 30 cannot become accidentally dislodged from the plate portion 31 before the sealing ring is applied to the plate portion.

It will be understood that other alternative methods of attaching the legs to the plate portion can be employed, for instance each leg can be spot welded or riveted to the plate portion. Alternatively again, one or both arms of the gripping portion of each leg can be provided with prongs in a conventional manner which will bite into the plate portion so as to resist removal of the gripping portion of the leg from the plate portion.

The plate portion can be any shape required, for instance it can be circular. If the plate portion is circular it is preferably provided with an odd number of legs and may for example require only three legs, equiangularly spaced around the periphery of the plate portion.

It will be seen from the above that we have provided a plug which comprises the combination of a mild steel plate portion and resilient carbon steel legs, thereby ensuring that the legs have sufficient resilience to stand up to bulk handling and assembly operations without becoming damaged.

What we claim is:
1. A plug for closing an aperture in a panel, the plug comprising a metal plate portion, a plurality of separate metal legs, formed from a different metal than the plate portion, attached to the plate portion and adapted to be snap-engaged through the panel aperture to mount the plug therein and a sealing ring mounted on the periphery of the plate portion so as to overlie the upper and lower surfaces of the plate portion and at least partially cover the attaching portion of each leg in the region of the periphery of the plate portion.

2. A plug as claimed in claim 1, wherein each leg includes a U-shaped attaching portion which grips the edge of the plate portion to mount the leg thereon.

3. A plug as claimed in claim 2 wherein the attaching portion of each leg and the plate portion of the plug are formed with co-operating engaging means for retaining the leg on the plate portion.

4. A plug as claimed in claim 3, wherein the sealing ring is formed from a heat softenable material.

* * * * *